United States Patent [19]

Leavitt

[11] 3,904,476

[45] Sept. 9, 1975

[54] TREATMENT OF CELLS OF A HYDROCARBON-CONSUMING MICROORGANISM

[75] Inventor: Richard I. Leavitt, Morrisville, Pa.

[73] Assignee: Mobil Oil Corporation, New York, N.Y.

[22] Filed: May 29, 1973

[21] Appl. No.: 364,444

[52] U.S. Cl................................. 195/28 R; 195/121
[51] Int. Cl.²............................................ C12B 1/26
[58] Field of Search............. 195/3 A, 95, 28 R, 82, 195/2, 109, 121, 81, 96; 426/204; 210/63; 260/112 R, 701, 702

[56] References Cited
UNITED STATES PATENTS

| | | | |
|---|---|---|---|
| 2,218,336 | 10/1940 | Kokatnur | 195/95 X |
| 3,264,196 | 8/1966 | Filosa | 195/82 |
| 3,654,084 | 4/1972 | Chepigo et al. | 195/109 |

*Primary Examiner*—A. Louis Monacell
*Assistant Examiner*—R. B. Penland
*Attorney, Agent, or Firm*—Charles A. Huggett; Vincent J. Frilette

[57] ABSTRACT

This specification discloses a process for treating cells of a hydrocarbon-consuming microorganism. These cells are those grown in a liquid culture medium containing an aqueous mineral salt nutrient and containing a liquid hydrocarbon as a source of carbon for growth and energy of the cells. Residual liquid hydrocarbon contaminates the cells, and for utilization of the cells, the cells have to be separated from the residual liquid hydrocarbon. This is done by contacting the cells with ozone while they are in suspension in an aqueous liquid. The residual liquid hydrocarbon is disassociated from the cells and is dispersed in the aqueous liquid. The cells are then removed from the aqueous liquid.

7 Claims, No Drawings

TREATMENT OF CELLS OF A HYDROCARBON-CONSUMING MICROORGANISM

BACKGROUND OF THE INVENTION

1. Field of the Invention

This invention relates to the growth of hydrocarbon-consuming microorganisms and relates more particularly to a process for the separation from the cells of the microorganism of contaminating, residual liquid hydrocarbon which provided the source of carbon for growth and energy of the cells.

2. Description of the Prior Art

The growth of hydrocarbon-consuming microorganisms in a culture medium containing an aqueous mineral salt nutrient and containing a liquid hydrocarbon as a source of carbon for growth and energy of the cells is known. Various methods for treating the cells of the microorganism to remove contaminating, residual liquid hydrocarbon from the surfaces thereof are also known. For example, U.S. Pat. No. 3,620,927 discloses a procedure for freeing microorganisms of the hydrocarbon used for their growth by a maturation treatment involving contacting the contaminated microorganism with an aqueous nutrient medium and a gas containing free oxygen in the absence of added hydrocarbon. U.S. Pat. No. 3,616,216 discloses a procedure for freeing microorganisms grown in relatively non-volatile hydrocarbons from the hydrocarbon by extraction of the microorganism with a relatively volatile hydrocarbon solvent and then removing the solvent hydrocarbon from the microorganism by vaporization means. U.S. Pat. No. 3,186,922 discloses mixing the hydrocarbon-contaminated microorganism with a surface active agent, centrifuging, and then washing in several stages with water. According to the method disclosed in U.S. Pat. No. 3,268,419, the microorganism which is contaminated with a hydrocarbon is treated in a first extraction stage with a polar solvent such as ethanol or isopropanol and in a second extraction stage with a hydrocarbon solvent such as hexane or an azeotropic mixture of hexane with isopropanol or ethanol.

U.S. Pat. No. 3,682,314 discloses a method of reconditioning an oil or oil emulsion lubricant that has been contaminated with microorganisms by conducting ozone through the lubricant.

SUMMARY OF THE INVENTION

A hydrocarbon-consuming microorganism is grown in a liquid culture medium containing an aqueous mineral salt nutrient and a liquid hydrocarbon providing a source of carbon for growth and energy of the microorganism. A residue of the liquid hydrocarbon adheres to or is associated with the surface of the cells of the microorganism. The residual liquid hydrocarbon is separated from the cells of the microorganism in accordance with the invention by contacting the cells of the microorganism with ozone while the cells of the microorganism are in suspension in an aqueous liquid. The residual liquid hydrocarbon is thereby disassociated from the surface of the cells of the microorganism and dispersed in the aqueous liquid. The cells can then be removed from the aqueous liquid.

DESCRIPTION OF THE PREFERRED EMBODIMENTS

Growing cells of a microorganism is of importance in view of the ability of many species to produce from low cost hydrocarbons valuable products like protein in appreciable amounts, a fact which makes them of value as feed for cattle and other animals, including humans. In the procedure for growing the cells of the microorganisms, which microorganisms are aerobic, a culture of the microorganism, the hydrocarbon which is a liquid hydrocarbon, an aqueous mineral salt nutrient, and an oxygen-containing gas are introduced into a fermenter to form a culture medium. The liquid hydrocarbon provides a source of carbon for growth and energy of the cells. The aqueous mineral salt nutrient provides water and inorganic salts and the oxygen-containing gas provides oxygen, each of which is also required for growth of the cells. At the end of the growth procedure, the cells of the microorganism are removed and recovered from the culture medium.

At the end of the growth procedure, a residue of the liquid hydrocarbon employed as a source of carbon for growth of the microorganism may adhere to or be associated with the surface of the cells of the microorganism. Thus, a film of the liquid hydrocarbon may cover partially or entirely the surface of the cells. The cells may also clump on droplets of the liquid hydrocarbon. From the standpoint of the utilization of the cells of the microorganism as a protein feed, the presence of the liquid hydrocarbon is, at the least, undesirable and the liquid hydrocarbon can be regarded as a contaminant. By the process of the invention, the residual liquid hydrocarbon is separated from the cells of the microorganism.

In carrying out the process of the invention, the cells of the microorganism containing the contaminating liquid hydrocarbon are contacted with the ozone while the cells of the microorganism are in suspension in an aqueous liquid. While it is not intended to limit the invention to the consequences of a theory, it is believed that the ozone, upon contact with the cells of the microorganism, effects oxidation of lyophilic groups localized on the surface of the cells of the microorganism. Further, with oxidation of the lyophilic groups, they lose their lyophilic character and, accordingly, no longer function to cause adherence between the liquid hydrocarbon and the surface of the cells of the microorganism. Regardless, upon contact of the cells of the microorganism with the ozone, the liquid hydrocarbon is disassociated from the surface of the cells of the microorganism. With the cells of the microorganism being in suspension in aqueous liquid, the aqueous liquid being immiscible with the liquid hydrocarbon, the disassociated hydrocarbon disperses in the aqueous liquid. The aqueous liquid thus contains the dispersed cells of the microorganism and the dispersed liquid hydrocarbon as distinct entities. The cells may then be removed from the aqueous liquid free of the liquid hydrocarbon.

Contact of the cells of the microorganism with ozone to separate the cells from the liquid hydrocarbon results in the cells being killed so that the process of the invention provides this additional feature.

Before further describing the contact of the cells of the microorganism containing the contaminating liquid hydrocarbon with the ozone, a description of the liquid culture mediums in which the cells of the microorganism are grown may be helpful. These liquid culture mediums contain, as previously indicated, in addition to the cells of the microorganism, an aqueous mineral salt nutrient and the liquid hydrocarbon. In the liquid culture medium, the aqueous mineral salt medium may be the continuous phase and the liquid hydrocarbon may be the discontinuous phase, i.e., the liquid culture medium may be in the form of an oil-in-water emulsion, the hydrocarbon being the oil and immiscible with the water portion of the aqueous mineral salt medium. Less commonly, the liquid hydrocarbon may be the continuous phase and the aqueous mineral salt medium may be the discontinuous phase, i.e., the liquid culture medium may be in the form of a water-in-oil emulsion. Where the liquid culture medium is in the form of an oil-in-water emulsion, the cells of the microorganism will be contained predominantly in the aqueous phase of the emulsion at the end of the growth period. Where the liquid culture medium is in the form of a water-in-oil emulsion, a large portion of the cells of the microorganism will be contained in the oil phase of the emulsion at the end of the growth period. These emulsions may be quite stable, i.e., the aqueous phase and the oil phase may not readily separate from each other after agitation at the end of the growth period has been terminated to form an underlying water phase and an overlying oil phase. On the other hand, these emulsions may be quite unstable and with the termination of agitation at the end of the growth period may spontaneously form an underlying water phase and an overlying oil phase.

The aqueous liquid in which the cells of the microorganism are in suspension while contacted with the ozone may be the aqueous mineral salt nutrient of the liquid culture medium in which they are grown. Thus, the cells of the microorganism may be contacted with the ozone while in suspension in the liquid culture medium. However, where the liquid culture medium is a stable emulsion, it is preferred, before contacting the cells of the microorganism with the ozone, to subject the liquid culture medium to a prior emulsion-breaking step to form an underlying layer of water and an overlying layer of hydrocarbon. Whether the emulsion is an oil-in-water or a water-in-oil emulsion, most of the cells of the microorganism will be contained in the underlying water layer after breaking of the emulsion. Further, it is preferred, even where the liquid culture medium is an unstable emulsion, to separate the overlying layer of hydrocarbon from the underlying layer of water before contacting the cells of the microorganism with the ozone. The cells of the microorganism contained in the underlying layer of water may then be contacted with the ozone.

For breaking the emulsion, whether the emulsion is an oil-in-water emulsion or a water-in-oil emulsion, any known procedure may be employed. Thus, a surfactant which tends to reverse the emulsion type may be added to the emulsion. Further, an oil-in-water emulsion may be broken by increasing its pH while a water-in-oil emulsion may be broken by decreasing its pH. A water-in-oil emulsion may be broken by centrifuging, by circulation against baffles, by oscillating plates, or by heating. Breaking may also be effected by addition of excess of the liquid in the dispersed phase, addition of a solvent miscible with water and the liquid hydrocarbon, destruction of the emulsifying agent where an emulsifying agent has been employed to obtain the culture medium in the desired form of emulsion, salting out, or electrolyzing.

Whether the cells are contained in the entire liquid culture medium, or only the aqueous portion thereof, it is preferred to effect a flocculation of the cells in order to reduce the volume of suspension which must be treated in order to effect contact of the cells with the ozone. Flocculation may be effected by any known means. Thus, for example, the cells may be flocculated by adding a flocculating agent such as alum, bentonite, or diallyldimethylammonium chloride polymer to the suspension of the cells.

The cells of the microorganism prior to contact with the ozone may be separated from the liquid culture medium. Thus, the cells may first be separated from the liquid culture medium as by filtration, centrifugation or other suitable procedure. They may then be mixed with and suspended in aqueous liquid. This aqueous liquid may be a new batch of water or aqueous solution. In this new suspension, they may be contacted with the ozone.

Contact of the cells of the microorganism in suspension in the aqueous liquid with the ozone may be carried out in any known manner for effecting contact of a gas with a liquid. Thus, the ozone may be passed through the suspension of the cells of the microorganism. This may be effected by passing the suspension of the cells of the microorganism currently or countercurrently to the ozone through a packed tower or other suitable device to effect intimate contact of a gas and a liquid. The ozone may also be bubbled or otherwise passed upwardly through the suspension of the cells. Agitation in addition to that supplied by the gas passed upwardly through the suspension of the cells may be provided as by a stirrer, paddle, propeller, or other suitable agitating device. The ozone may also be contacted with the cells by maintaining the suspension thereof in a pressure vessel wherein a pressure of the ozone is maintained. Agitation of the suspension of the cells in the pressure vessel may be effected during contact with the ozone.

The ozone employed for contact with the cells of the microorganism may be pure ozone. However, pure ozone is relatively expensive and ozone diluted with another gas or with other gases may be employed. Thus, an ozone-containing gas may be employed. This gas may be air containing ozone. The ozone-containing gas may contain any desired proportion of ozone. For example, the gas may contain 5% by volume of ozone. Proportions higher than 5% may also be employed. The proportion of ozone may be as low as 3% by volume. The proportion may also be lower than 3% by volume but these proportions will require a longer time of contact to effect satisfactory separation of the residual liquid hydrocarbon from the cells.

The ozone employed may be obtained by any suitable means such as by ozonization of air in an ozonizer where electrolysis of the air is effected.

The time of contact of the ozone with the cells of the microorganism should be sufficient to obtain separation of the residual hydrocarbon from the cells. This time, of course, will be finite and will depend upon several factors. One of these is the amount of the contaminating hydrocarbon associated with the cells. Another is the proportion of the ozone in the ozone-containing gas where such a gas is employed. Still another factor is the degree of agitation of the suspension of the cells in contact with the ozone. Yet another factor is the type of microorganism. Accordingly, no definite rule can be given as to the time of contact of the ozone with the cells to effect any given degree of separation of the residual hydrocarbon from the cells. However, for any given amount of residual hydrocarbon, proportion of ozone in the ozone-containing gas, degree of agitation, and type of microorganism, the time of contact to effect any given degree of separation of contaminating hydrocarbon from the cells can be determined by removing a portion of the cells from the suspension thereof at progressive intervals of time and determining the amount of contaminating hydrocarbon associated with the cells until the desired degree of separation has been attained. Ordinarily, with an ozone-containing gas containing 3% or more by volume of ozone, the time of contact need not be more than 5 minutes. Further, ordinarily, the time of contact should be at least 15 seconds. Thus, the time of contact ordinarily can be between 15 seconds and 5 minutes.

The time of contact of the cells of the microorganism with the ozone to effect a desired degree of separation of hydrocarbon is also dependent upon the pH. With increasing pH, the time of contact is reduced. However, it is preferred not to increase the pH of the suspension of the cells in contact with the ozone to above about 9.5 in order to avoid solubilization of the cell protein. Increase in the pH may be effected by adding a base such as caustic or ammonium hydroxide to the suspension. The pH of the suspension when the cells are contacted with the ozone may be between 3.0 and 9.5 Preferably, the pH should be between 8.0 and 9.5.

Following contact of the cells of the microorganism with the ozone, it is preferred to effect removal of residual ozone from the cells. This can be effected by passing air free of ozone through the suspension of the cells. Other gases, such as carbon dioxide for example, may be employed in place of air.

Following contact of the cells of the microorganism with the ozone while in suspension in an aqueous liquid, the hydrocarbon residue which had been adherent on the surface of the cells will be dispersed in the aqueous liquid. This dispersed hydrocarbon will rise to the surface of the aqueous liquid. The hydrocarbon may then be decanted from the aqueous liquid. The cells free of the hydrocarbon may then be removed from the remaining aqueous liquid by filtration or other simple separation procedure.

The process of the invention may be employed in connection with the growth of any hydrocarbon-utilizing microorganism. These microorganisms include bacteria, fungi, yeasts, and molds.

With respect to bacteria employed, suitable genera include Pseudomonas, Bacillus, Flavobacterium and Sarcina. Illustrative species of these genera are *P. aeruginosa, P. oleovorans, P. putida, P. boreopolis, P. methanica, P. fluorescens, P. pyocyanea, B. aureus, B. acidi, B. subtillis, B. urica, B. cereus, B. coagulans, B. mycoides, B. circulans, B. megaterium, Flavobacterium aquatile, Sarcina alba,* and *Sarcina luteum.* Other preferred genera are Achromobacter and Nocardia, as illustrated by species such as *A. xerosis, A. agile, A. gutatus, A. superficialis, A. parvulus, A. cycloclastes, N. salmonicolor, N. asteroides, N. minimus, N. opaca, N. corallina, N. rubra,* and *N. paraffinae.* The genus Mycobacterium is useful, particularly such species as *M. paraffinicum, M. phlei, M. lacticola, M. rhodochrous, M. smegmatis, M. rubrum, M. luteum, M. album,* and *M. byalinicum.*

Still other hydrocarbon-utilizing bacteria are *Methanomonas methanica, Methanomonas sp., Micrococcus paraffinae, B. aliphaticum, B. hidium, B. benzoli,* and species of Micromonospora. Other useful genera include Brevibacterium, Aerobacter, and Corynebacterium.

Of the fungi, there may be employed any fungus within the classification Eumycetes or true fungi, but preferably those from the classification Fungi Imperfecti or from the classification Phycomycetes. Preferred fungi from the class Fungi Imperfecti are species of the genera Aspergillus and Penicillium, as illustrated by *A. niger, A. glaucus, A. oryzae, A. flavus, A. terreus, A. itaconicus, P. notatum, P. chrysogenum, P. glaucum, P. griseofulvum, P. expansum, P. digitatum* and *P. italicum.* Other suitable organisms include various species of the genera Monilia, Helminthosporium, Alternaria, Fusarium, and Myrothecium. Preferred fungi of the class Phycomycetes include species from the genera Rhizopus and Mucor, such as *R. nigrificans, R. oryzae, R. delemar, R. arrhizus, R. stolonifer, R. sp., M. mucedo,* and *M. genevensis.*

Some of the foregoing genera of fungi are also characterized as molds, such as Aspergillus, Penicillium, Rhizopus, and Mucor, but it will be understood that all are true fungi or Eumycetes.

Of the yeasts, the preferred organisms are of the family Cryptococcaccae, and, particularly, of the subfamily Cryptococcoidae. Preferred genera are Pichia, Torulopsis (or Turola), and Candida. Preferred species are *Pichia polymorpha, Candida lipolytica, Candida pulcherrima, Candida utilis, Candida utilis Variati major, Candida tropicalis, Candida intermedia,* and *Torulopsis colliculosa.* Other useful species are *Hansenula anomala, Oidium lactia,* and *Neurospora sitophila.*

The hydrocarbon is one that is liquid at the temperature of growth of the microorganism. Aliphatic hydrocarbons are preferred, and these may be saturated or unsaturated, straight or branched chain, and having up to 20 or 30 or 40 or more carbon atoms. Saturated straight chain hydrocarbons containing 15 or more carbon atoms are particularly desirable. Cyclic hydrocarbons, comprising aromatic and alicyclic compounds, are also of use, including alkyl-substituted cyclic compounds having 1, 2, or more alkyl substituents, each of any suitable length, chain configuration, and degree of unsaturation, and in which the cyclic moiety is aromatic or cycloparaffinic. Alkyl-substituted aromatic hydrocarbons include toluene, the various xylenes, mesitylene, ethyl benzene, p-cymene, the diethylbenzenes, and the isomeric propylbenzenes, butylbenzenes, amylbenzenes, heptylbenzenes, and octylbenzenes. Among the useful alkyl-substituted cycloparaffins are methylcyclopentane, the di- and trimethylcyclopentanes, ethylcyclopentane, the diethylcyclopentanes, the various propyl-, butyl-, amyl-, hexyl-, and octylcyclopentanes. There may be also used the alkylcyclohexanes, which are substituted in a manner corresponding to the former alkylcyclopentanes, as well as such compounds as the various tetramethylcyclohexanes, methylethylcyclohexanes, methylpropylcyclohexanes, and the like. Crude oils, various petroleum fractions, and residua are also of use.

It will be appreciated that the hydrocarbon may be liquid not only by having a suitable melting point but also by being dissolved in a suitable solvent. The hydrocarbons contemplated in the preceding paragraphs are those which are normally liquid at temperatures of growth of the microorganisms. However, other useful hydrocarbons are those which are normally gaseous at these temperatures, such as methane, ethane, propane, butane and other $C_3$ to $C_5$ hydrocarbons. These gaseous hydrocarbons may be dissolved in a normally liquid hydrocarbon, such as a petroleum fraction in the gasoline or kerosene boiling range, or in an alkane like octane, nonane, or decane. Also, normally, solid hydrocarbons may be used as the source of carbon by dissolving them in a hydrocarbon solvent, in the manner described. Whereas gaseous hydrocarbons normally will not contaminate the cells of the microorganism or if they do they may be easily separated from the cells by procedures involving vaporization, the liquid hydrocarbon solvents in which they are dissolved will contaminate the cells and separation of the liquid solvent from the cells will be effected by the process of the invention.

The mineral nutrients required for the growth of the microorganisms and contained in the aqueous mineral salt nutrient comprise a source of nitrogen such as nitrate or nitrite or ammonium salt or urea, and such ions as potassium, magnesium, phosphate, and sulfate, as well as ions of trace elements like cobalt and molybdenum. Traces of manganese, iron, and calcium may be present. As water is included in the liquid culture medium, most of these ions will usually be present in sufficient quantity in ordinary potable water supplies. However, it is desirable to add the ions to the nutrient to ensure their presence in sufficient quantity for growth of the microorganisms. The compositions of aqueous mineral salt nutrients are well known and no further description appears to be necessary.

The cells of the microorganism may be grown in a continuous or batch operation.

The following example will be illustrative of the invention.

Yeast was grown in an airlift fermenter employing an aqueous mineral salt nutrient and employing n-hexadecane as the source of carbon for growth of the yeast. The n-hexadecane, during growth of the yeast, was maintained in the liquid culture medium in the amount of 10% by volume. Following growth of the yeast, the liquid culture medium was removed from the fermenter. Ozone, generated with a U.S. air ozonizer using 700 cubic centimeters per minute of oxygen, was passed through 10 cubic centimeter samples of the liquid culture medium for varying periods of time. The samples were then examined microscopically to approximate the amount of hydrocarbon associated with the yeast cells. The following table gives the results obtained.

TABLE

| Ozonization Time - Minutes | Microscopic Appearance |
|---|---|
| 0 | Cells clumped on hydrocarbon droplets |
| 0.5 | Some disassociation |
| 3.0 | About 50% of the cells free of hydrocarbon |
| 5.0 | Most of the cells free of hydrocarbon |

In the procedure described above, the pH of the liquid culture medium was 3.1. The procedure was repeated with another 10 cubic centimeter sample of the liquid culture medium except that the pH of the sample was raised to 8.8. At this pH, ozonization of the sample for 0.5 minute resulted in most of the cells being free of hydrocarbon.

I claim:

1. In a process for producing edible protein, which process comprises:
    a. cultivating an aerobic, hydrocarbon-consuming microorganism in a fluid culture medium comprising an aqueous mineral salt nutrient and a liquid hydrocarbon nutrient and an oxygen-containing gas, whereby a portion of said liquid hydrocarbon is consumed and an aqueous suspension of cultivated cells with surface-associated contaminant comprising unconsumed liquid hydrocarbon is formed, and
    b. subsequently recovering said surface-contaminated cells in a form and of such purity as to render them suitable for consumption, said recovery comprising a purification step,
   the improvement in said recovery, whereby said surface-contaminated cultivated cells are rapidly purified, which comprises: killing said cells with an ozone-containing gas while in aqueous suspension; dissociating said liquid hydrocarbon contaminant and said cultivated cells into distinct entities; and, separating dead cultivated cells substantially free of hydrocarbon impurities.

2. The process of claim 1 wherein said cultivated cells are removed from said culture medium prior to contacting said cells with said ozone-containing gas.

3. The process of claim 1 wherein said ozone-containing gas comprises oxygen.

4. The process of claim 1 wherein said ozone-containing gas is air.

5. The process of claim 3 wherein said gas consists of oxygen that contains at least about 3 volume percent ozone and wherein said contacting time is from about 30 to about 300 seconds.

6. The process described in claim 1 wherein said aqueous suspension of said cultivated cells is adjusted to a pH between 8.0 and 9.5 prior to said contacting with said ozone-containing gas.

7. The process of claim 6 wherein said ozone-containing gas comprises oxygen and at least about 3 volume percent ozone.

* * * * *